United States Patent

Struss et al.

[11] Patent Number: 6,149,166
[45] Date of Patent: Nov. 21, 2000

[54] APPARATUS FOR USE IN A VEHICLE SUSPENSION

[75] Inventors: Frank J. Struss, Livonia; Brian A. Urbach, Rochester Hills, both of Mich.

[73] Assignee: TRW Inc., Lyndhurst, Ohio

[21] Appl. No.: 09/122,571

[22] Filed: Jul. 24, 1998

[51] Int. Cl.[7] ................................................. B60G 21/055
[52] U.S. Cl. .............................. 280/5.511; 280/124.106; 267/191; 267/277
[58] Field of Search ............................. 280/5.508, 5.511, 280/124.107, 124.106; 267/188, 191, 277

[56] References Cited

U.S. PATENT DOCUMENTS

| 4,796,911 | 1/1989 | Kuroki et al. . |
| 4,834,419 | 5/1989 | Kozaki et al. ........................ 280/5.503 |
| 4,896,754 | 1/1990 | Carlson et al. ......................... 192/21.5 |
| 5,090,531 | 2/1992 | Carlson .................................. 192/21.5 |
| 5,167,850 | 12/1992 | Shtarkman . |
| 5,322,484 | 6/1994 | Reuter . |
| 5,556,083 | 9/1996 | Furihata et al. . |
| 5,845,753 | 12/1998 | Bansbach ............................... 192/21.5 |
| 5,992,582 | 11/1999 | Lou et al. .............................. 188/267.1 |

FOREIGN PATENT DOCUMENTS

| 0356145 | 2/1990 | European Pat. Off. . |
| 0933240 | 8/1999 | European Pat. Off. . |
| 6-200960 | 7/1994 | Japan . |
| 2275661 | 9/1994 | United Kingdom . |

Primary Examiner—Lanna Mai
Assistant Examiner—Ruth Ilan
Attorney, Agent, or Firm—Tarolli, Sundheim, Covell, Tummino & Szabo L.L.P.

[57] ABSTRACT

An apparatus (12) for use in a vehicle suspension (10) comprises an anti-roll bar (30) having opposite first and second ends (32 and 34) for connecting with respective first and second control arms (20 and 22) of the vehicle. The anti-roll bar (30) includes a portion (40) between the ends (32, 34) which is subjected to torsional forces. The anti-roll bar (30) has an actuatable device (70) for varying the torsional stiffness of the portion (40) of the anti-roll bar (30). At least one sensor (110) senses a vehicle characteristic and generates a signal indicative of the sensed vehicle characteristic. An electronic control unit (112) actuates the actuatable device (70) to vary the torsional stiffness of the portion (40) of the anti-roll bar (30). The electronic control unit (112) is responsive to the signal from the at least one sensor (110).

6 Claims, 1 Drawing Sheet

APPARATUS FOR USE IN A VEHICLE SUSPENSION

FIELD OF THE INVENTION

The present invention is directed to an apparatus for use in a vehicle suspension and, more particularly, is directed to an apparatus for varying the torsional stiffness of an anti-roll bar in a vehicle suspension.

BACKGROUND OF THE INVENTION

Anti-roll bars, also known as stabilizer bars or sway bars, are used in both front and rear suspensions to reduce vehicle body lean during vehicle turns. The anti-roll bar, which twists during body lean, increases the resistance to body lean provided by the suspension springs and suspension control arms of the vehicle suspension. In addition, vehicle handling characteristics, such as understeer and oversteer, can be adjusted by changing the torsional stiffness of the anti-roll bar.

A torsionally stiff anti-roll bar is known to increase the spring rate of the suspension during road bumps encountered by only one tire, thereby removing some of the independence of an independent suspension and stiffening the ride of the vehicle. Consequently, the torsional stiffness of the anti-roll bar is typically optimally selected for a given vehicle based on the vehicle's intended handling and ride characteristics.

SUMMARY OF THE INVENTION

The present invention is an apparatus for use in a vehicle suspension. The apparatus comprises an anti-roll bar having opposite first and second ends for connecting with respective first and second control arms of the vehicle. The anti-roll bar includes a portion between the ends which is subjected to torsional forces. The anti-roll bar has actuatable means for varying the torsional stiffness of the portion of the anti-roll bar between the ends. At least one sensor senses a vehicle characteristic and generates a signal indicative of the sensed vehicle characteristic. Electronic control means actuates the actuatable means to vary the torsional stiffness of the portion of the anti-roll bar. The electronic control means is responsive to the signal from the at least one sensor.

The portion of the anti-roll bar whose torsional stiffness is varied comprises first and second sections of the anti-roll bar. The first section is connected with the first end of the anti-roll bar and the second section is connected with the second end of the anti-roll bar. The actuatable means for varying the torsional stiffness of the portion of the anti-roll bar comprises a clutch mechanism interconnecting the first and second sections of the anti-roll bar. The clutch mechanism preferably comprises a viscous coupling containing a fluid which transmits torque between the first and second sections. The viscosity of the fluid changes in response to changes in an energy field controlled by the electronic control means.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
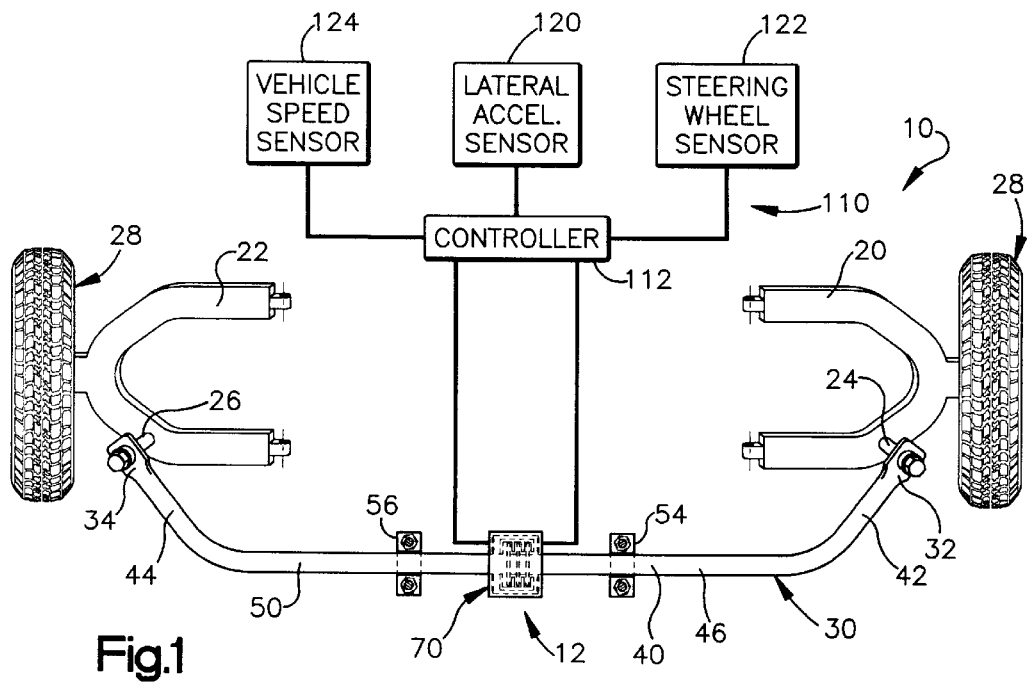
FIG. 1 is a schematic top view of parts of a vehicle front suspension constructed in accordance with the present invention.

FIG. 1 schematically illustrates a portion of a vehicle front suspension 10 which includes an apparatus 12 for varying the torsional stiffness of an anti-roll bar 30 in the vehicle suspension.

The suspension 10 further includes first and second control arms 20 and 22, respectively, and first and second link members 24 and 26, respectively. The first and second control arms 20 and 22 have an identical generally U-shaped configuration. Each of the control arms 20, 22 connects with a steerable wheel assembly 28 in the vehicle. The first control arm 20 is connected by the first link member 24 to a first end 32 of the anti-roll bar 30 and the second control arm 22 is connected by the second link member 26 to a second end 34 of the anti-roll bar.

The anti-roll bar 30 has a generally U-shape defined by a main body portion 40 and oppositely disposed first and second leg portions 42 and 44, respectively. The leg portions 42, 44 extend from the main body portion 40 at an angle. The first end 32 of the anti-roll bar 30 is located at the terminal end of the first leg portion 42, and the second end 34 of the anti-roll bar is located at the terminal end of the second leg portion 44.

Figure 2:
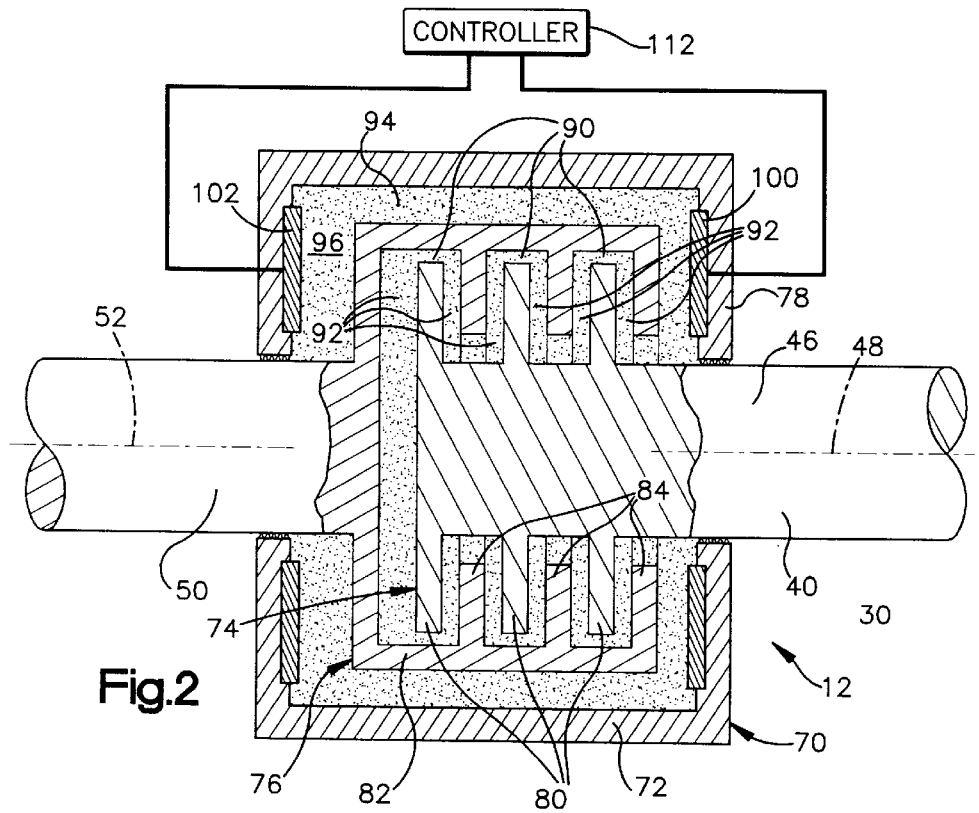
FIG. 2 is an enlarged schematic view, partly in section, of a portion of the vehicle suspension shown in FIG. 1.

The main body portion 40 of the anti-roll bar 30 includes a first section 46 connected with the first leg portion 42 and centered on a first axis 48 (FIG. 2). The main body portion 40 further includes a second section 50 connected with the second leg portion 44 and centered on a second axis 52 (FIG. 2). The first section 46 of the main body portion 40 is supported for rotation about the first axis 48 by a first bracket 54 which is attached to the vehicle frame in a known manner (not shown). The second section 50 of the main body portion 40 is supported for rotation about the second axis 52 by a second bracket 56 which is attached to the vehicle frame in a known manner (not shown).

The anti-roll bar 30 further includes a clutch mechanism 70 interconnecting the first and second sections 46 and 50 of the main body portion 40 and which is actuatable to vary the torsional stiffness of the main body portion of the anti-roll bar. The clutch mechanism 70 comprises a viscous coupling 72 (FIG. 2) having interdigitated first and second disc sections 74 and 76, respectively, enclosed by a housing member 78. The first disc section 74 extends from the first section 46 of the main body portion 40, and the second disc section 76 extends from the second section 50 of the main body portion.

The first disc section 74 of the viscous coupling 72 comprises a plurality of radially outwardly extending disc members 80, each of which has a plurality of radially extending slits (not shown). The second disc section 76 of the viscous coupling 72 comprises a cylindrical shroud member 82 attached to the second section 50 of the main body portion 40 and having a plurality of disc members 84 extending radially inwardly from the shroud member. The disc members 84 also have radially extending slits (not shown).

A plurality of radial gaps 90 and axial gaps 92 are formed between the interdigitated first and second disc members 74 and 76 in the viscous coupling 72. Further, an annular chamber 94 is formed between the shroud member 82 and the housing member 78 in the viscous coupling 72. The plurality of radial gaps 90 and axial gaps 92 and the annular chamber 94 together define a fluid chamber 96 inside the viscous coupling 72. The fluid chamber 96 is sealed by first and second seals (not numbered) which are attached to opposite ends of the housing member 78 and which sealingly engage the first and second sections 46 and 50, respectively, of the main body portion 40 of the anti-roll bar 30.

The fluid chamber 96 in the viscous coupling 72 is filled with an energy field responsive fluid, such as an electrorheological fluid or magnetic rheological fluid. For purposes of simplicity, only electrorheological fluid will be discussed further. An electrorheological fluid is a two-phase material in which its resistance to flow (or viscosity) varies as a function of an electric field acting on the fluid. When an electric field acts on the electrorheological fluid, the viscosity of the electrorheological fluid is proportional to the strength of the electric field. By varying the strength of the electric field, the viscosity of the electrorheological fluid can be varied.

In order to provide an electric field to the electrorheological fluid, first and second electrodes 100 and 102, respectively, are disposed on opposites sides of the fluid chamber 96 and are mounted to the housing member 78. The electrodes 100, 102 are electrically isolated from each other and are individually operatively coupled to a source of electrical energy described further below. The desired electric field is provided by establishing a voltage potential between the first and second electrodes 100 and 102.

The apparatus 12 further includes a plurality of sensors 110 which sense vehicle dynamics and an electronic control unit or controller 112. The plurality of sensors 110 preferably includes, but is not limited to, a lateral acceleration sensor 120, a steering wheel rotation sensor 122, and a vehicle speed sensor 124. The lateral acceleration sensor 120 is mounted in the vehicle and is electrically connected to the controller 112. The lateral acceleration sensor 120 continuously senses the lateral acceleration of the vehicle and generates electrical signals indicative of the sensed lateral acceleration. These electrical signals are provided to the controller 112.

The steering wheel rotation sensor 122 is preferably located in the vehicle steering column (not shown) and is electrically connected to the controller 112. The steering wheel rotation sensor 122 continuously senses the magnitude and rate of rotation of the vehicle steering wheel (not shown) and generates electrical signals indicative of these parameters. The vehicle speed sensor 124 is mounted in the vehicle and is electrically connected to the controller 112. The vehicle speed sensor 124 continuously senses the vehicle speed and generates corresponding electrical signals which are sent to the controller 112.

The controller 112 is electrically connected to a source of electrical energy in the vehicle, such as the vehicle battery (not shown), and is operable to provide a variable electrical field, in the form of voltage, to the electrodes 100, 102 in response to the signals received from the plurality of sensors 110. By varying the voltage potential between the first and second electrodes 100 and 102, the viscosity of the electrorheological fluid can be changed and, in turn, the torsional stiffness of the main body portion 40 of the anti-roll bar 30 can be changed.

For example, if a low strength electrical field is applied to the electrorheological fluid by having a relatively small voltage potential between the first and second electrodes 100 and 102, the viscosity of the electrorheological fluid will be correspondingly low. The low viscosity of the electrorheological fluid in the viscous coupling 72 will provide the main body portion 40 of the anti-roll bar 30 with a low torsional stiffness and will permit a small amount of relative rotation between the first and second sections 46 and 50 of the main body portion of the anti-roll bar to occur. In this torsionally elastic condition, the first and second sections 46 and 50 can rotate about their respective axes 48 and 52. Further, in this condition, the ride of the vehicle will be generally soft and will have a relatively low suspension spring rate during road bumps encountered by only one tire. The vehicle will also exhibit a relatively large amount of body lean during turns.

On the other hand, if a high strength electrical field is applied to the electrorheological fluid by having a relatively large voltage potential between the first and second electrodes 100 and 102, the viscosity of the electrorheological fluid will be correspondingly high. The high viscosity of the electrorheological fluid in the viscous coupling 72 will provide the main body portion 40 of the anti-roll bar 30 with a high torsional stiffness and will not permit relative rotation between the first and second sections 46 and 52 of the main body portion of the anti-roll bar to occur. In this torsionally stiff condition, the ride of the vehicle will be generally stiff and will have a relatively high suspension spring rate during one-tire bumps. Further, the vehicle will exhibit a relatively low amount of body lean during turns.

The aforementioned torsionally elastic and torsionally stiff conditions for the anti-roll bar 30 can be pre-programmed as an algorithm in the controller 112 so that when one or more of the sensors 110 sense certain driving conditions, such as (i) slow driving on a straight and/or level road or (ii) high speed cornering, the torsionally elastic or the torsionally stiff condition is automatically established. Further, the stiffness of the anti-roll bar 30 can be variably adjusted to any number of unique stiffness rates in-between the torsionally elastic and torsionally stiff conditions by applying a variable strength electric field to the electrorheological fluid according to the programming of the algorithm in the controller 112.

It is further contemplated that the algorithm in the controller 112 could be revisable by the driver of the vehicle to customize the ride and handling characteristics of the vehicle to his or her own preferences. A manual setting device (not shown) mounted in the passenger compartment of the vehicle would be electrically connected to the controller 112 to enable the driver to revise the algorithm. From the above description of the invention, those skilled in the art will perceive improvements, changes and modifications. Such improvements, changes and modifications within the skill of the art are intended to be covered by the appended claims.

Having described the invention, we claim:

1. An apparatus for use in a suspension of a vehicle, the apparatus comprising:

an anti-roll bar having a first section and a second section, each section having an outer end for connecting to the vehicle and an inner end, the inner ends being relatively rotatable;

a clutch mechanism forming a viscous coupling for interconnecting the inner ends of the first and second sections, the inner ends of the first and second sections being coaxial;

the first section having a first disc section comprising a plurality of parallel, axially spaced, radially outwardly extending first disc members, the first disc members lying in axially spaced planes perpendicular to the axis of the inner end of the first section;

the second section having a second disc section comprising a cylindrical shroud member which encircles the first disc section, the shroud member being coaxial with the inner end of the second section and having a plurality of parallel, axially spaced, radially inwardly extending second disc members, the second disc members lying in axially spaced planes perpendicular to the axis of the shroud member;

each radially outwardly extending first disc member extending into a space formed by at least one radially inwardly extending second disc member, a series of gaps being formed between the respective disc members;

a housing containing the first disc members, the shroud member and the second disc members;

the first and second disc sections being relatively rotatable with respect to one another about their common axis;

an electrorheological or magnetorheological fluid filling the series of gaps formed by the respective disc sections and an area surrounding the shroud member within the housing;

at least one sensor for sensing a vehicle condition and a controller responsive to the at least one sensor for varying the viscosity of the fluid, the amount of relative rotation of the first and second disc sections being limited by the resistance provided by the viscosity of the fluid and not being limited by the contacting of the first and second disc members.

2. The apparatus of claim 1, further being defined by:

a first bracket being connectable to the vehicle and supporting the first section of the anti-roll bar; and a second bracket being connectable to the vehicle and supporting the second section of the anti-roll bar.

3. The apparatus of claim 1, further being defined by:

a plurality of electrodes being attached to the clutch mechanism, the controller being electrically connected to the electrodes and operable to send an electric signal to the electrodes.

4. The apparatus of claim 1, further being defined by:

the at least one sensor being a lateral acceleration sensor.

5. The apparatus of claim 1, further being defined by:

the at least one sensor being a steering wheel rotation sensor.

6. The apparatus of claim 1, further being defined by:

the at least one sensor being a vehicle speed sensor.

* * * * *